United States Patent
Ryan

(10) Patent No.: US 9,635,867 B2
(45) Date of Patent: May 2, 2017

(54) FISH PROCESSING SYSTEMS AND METHODS

(71) Applicant: Robert M. Ryan, Woodway, WA (US)

(72) Inventor: Robert M. Ryan, Woodway, WA (US)

(73) Assignee: Ryco Equipment, Inc., Mountlake Terrace, WA (US)

( * ) Notice: Subject to any disclaimer, the term of this patent is extended or adjusted under 35 U.S.C. 154(b) by 325 days.

(21) Appl. No.: 14/253,738

(22) Filed: Apr. 15, 2014

(65) Prior Publication Data

US 2015/0289527 A1    Oct. 15, 2015

(51) Int. Cl.
| | |
|---|---|
| *A22C 21/06* | (2006.01) |
| *A22C 25/08* | (2006.01) |
| *A22C 25/14* | (2006.01) |
| *A22C 25/12* | (2006.01) |
| *B65G 17/06* | (2006.01) |
| *B65G 17/36* | (2006.01) |

(52) U.S. Cl.
CPC .............. *A22C 25/08* (2013.01); *A22C 25/12* (2013.01); *A22C 25/142* (2013.01); *A22C 25/145* (2013.01); *B65G 17/061* (2013.01); *B65G 17/36* (2013.01); *B65G 2201/0202* (2013.01)

(58) Field of Classification Search
CPC ........ A22C 21/06; A22C 25/12; A22B 5/0005
USPC ......... 452/106, 149–153, 160–162, 165, 170
See application file for complete search history.

(56) References Cited

U.S. PATENT DOCUMENTS

| | | |
|---|---|---|
| 3,925,846 A | 12/1975 | Leander |
| 4,091,506 A | 5/1978 | Soerensen et al. |
| 4,356,596 A | 11/1982 | Gundersen et al. |
| 4,365,387 A | 12/1982 | Hartmann et al. |
| 4,563,793 A | 1/1986 | Ryan |
| 4,630,335 A | 12/1986 | Claudon |
| 4,811,460 A | 3/1989 | Emanuelsen |
| 4,993,116 A | 2/1991 | Urushibara et al. |
| 5,026,318 A | 6/1991 | Jahnke |
| 5,106,334 A | 4/1992 | Kristinsson |
| 5,167,570 A | 12/1992 | Ryan |
| 5,352,152 A | 10/1994 | Claudon |
| 5,413,524 A | 5/1995 | Yoshida |

(Continued)

FOREIGN PATENT DOCUMENTS

JP    4-16143 A    1/1992

OTHER PUBLICATIONS

"Precision Chain Products Catalog PC600," Peer Chain Company, available for download at least as early as Jan. 2014, 52 pages.

*Primary Examiner* — Richard Price, Jr.
(74) *Attorney, Agent, or Firm* — Seed IP Law Group LLP

(57) ABSTRACT

Methods and systems for processing fish are provided which enable the efficient conveyance of fish products from one fish processing subsystem or station to another in a particularly reliable and robust form factor. The systems may include a first fish processing subsystem configured to process fish with the fish orientated in a first orientation; a second fish processing subsystem configured to process the fish with the fish orientated in a second orientation different from the first orientation; and a conveyor system that couples the first fish processing subsystem to the second fish processing subsystem with the conveyor system being configured to receive the fish in the first orientation and deliver the fish in the second orientation. Related methods of conveying and processing fish are also provided.

11 Claims, 4 Drawing Sheets

(56) References Cited

U.S. PATENT DOCUMENTS

| | | | |
|---|---|---|---|
| 5,735,735 A | 4/1998 | Hahn et al. | |
| 5,980,376 A | 11/1999 | Grosseholz et al. | |
| 6,361,426 B1 * | 3/2002 | Kragh | A22C 25/16 452/157 |
| 6,368,203 B1 | 4/2002 | Puretz | |
| 7,179,163 B1 | 2/2007 | Vedsted et al. | |
| 7,252,584 B2 * | 8/2007 | Kragh | A22C 25/12 452/163 |
| 7,427,229 B2 | 9/2008 | Grosseholz et al. | |
| 7,464,995 B2 * | 12/2008 | Csapo | B60B 3/004 301/35.626 |
| 7,467,995 B2 | 12/2008 | Ketels | |
| 7,559,830 B2 | 7/2009 | Solberg et al. | |
| 7,828,635 B2 | 11/2010 | Paulsohn et al. | |
| 7,857,686 B2 * | 12/2010 | Arnason | A22C 25/166 452/161 |
| 7,988,542 B1 | 8/2011 | Yamase et al. | |
| 8,092,283 B2 * | 1/2012 | Hansen | A22C 25/08 452/121 |
| 8,512,106 B2 * | 8/2013 | Ryan | A22C 25/145 452/121 |
| 8,690,645 B2 | 4/2014 | Ryan | |
| 8,814,637 B2 * | 8/2014 | Jurs | A22C 25/16 452/162 |
| 8,986,077 B1 | 3/2015 | Ryan | |
| 2013/0189913 A1 | 7/2013 | Ryan | |

* cited by examiner

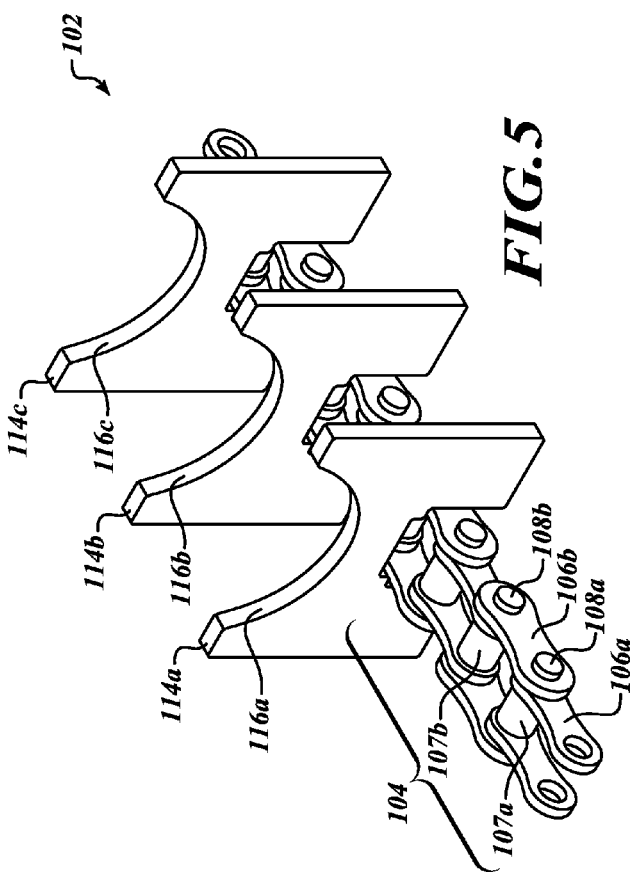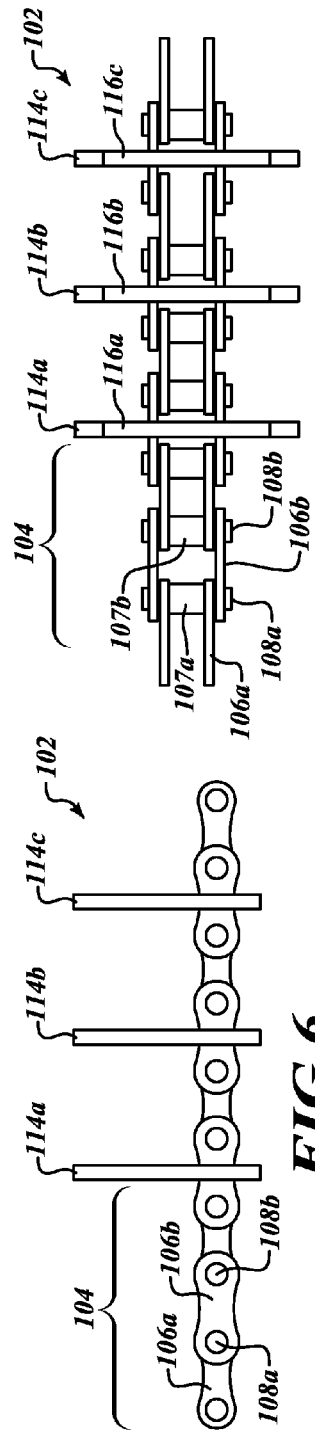

FISH PROCESSING SYSTEMS AND METHODS

BACKGROUND

Technical Field

This disclosure generally relates to systems and methods for processing fish, and more particularly to systems and methods for conveying fish from one processing subsystem to another in a reliable and consistent manner.

Description of the Related Art

In some fish products, the head is removed at the gills, leaving a hard cartilage structure on the head end of the fish called the collar. The viscera, including the gonads (roe or milt) are removed, the kidney membrane is cut and the kidney is removed with water sprays and brushes. In the salmon industry, this remaining fish product is called a head and gut product and is a valuable commodity. An initial step of preparing such head and gut product is the removal or severing of the head from the body of the fish. Various devices for severing the head of the fish are known, including systems which feature a guillotine knife operated with a pneumatic cylinder which is actuated with compressed air to plunge through fish which are transported beneath the knife. Other example fish processing systems for removing the head of fish are described in US Patent Application Publication No. 2013/0189913, which is incorporated herein by reference in its entirety. Various fish processing systems for removing the viscera of fish are also known, including, for example, those described in U.S. Pat. No. 8,512,106, which is incorporated herein by reference in its entirety. The aforementioned deheading and gutting systems feature distinct features and functionality and may be considered distinct fish processing subsystems. Notably, fish gutting subsystems are generally positioned downstream of fish deheading subsystems to receive fish in a headless condition for subsequently removing the guts. Various conveyor systems are known to move fish between and among such fish processing subsystems.

While known conveyor systems have been generally effective in moving fish between and among fish processing subsystems or stations, such conveyor systems may suffer from various deficiencies and shortcomings, such as, for example, being bulky or cumbersome, and the conveyor systems may be overly complex and expensive to produce and/or operate.

BRIEF SUMMARY

The systems and methods of processing fish described herein provide for the efficient conveyance of fish products from one fish processing subsystem or station to another in a particularly reliable and robust form factor.

According to one embodiment, a fish processing system may be summarized as including a first fish processing subsystem configured to process fish in a sequential manner with the fish orientated in a first orientation that is transverse to a direction of travel through the first fish processing subsystem; a second fish processing subsystem positioned downstream of the first fish processing subsystem, the second fish processing subsystem configured to process the fish in a sequential manner with the fish orientated in a second orientation that is parallel to a direction of travel through the second fish processing subsystem; and a conveyor system that couples the first fish processing subsystem to the second fish processing subsystem, the conveyor system configured to receive the fish in the first orientation transverse to the direction of travel through the first fish processing subsystem and deliver the fish in the second orientation parallel to the direction of travel through the second fish processing subsystem. The first fish processing subsystem may be a fish deheading station configured to dehead the fish as the fish are transported through the fish deheading station. The second fish processing subsystem may be a fish gutting station configured to remove viscera of the fish as the fish are transported through the fish gutting station.

The conveyor system may include a roller chain assembly configured to transport the fish from the first fish processing subsystem to the second fish processing subsystem along a curvilinear path. The curvilinear path may include a central portion having a generally constant radius of curvature between two linear end portions that are perpendicular to each other.

The roller chain assembly may comprise a series of fish support members, each fish support member including a concave profile within which to receive and support a portion of the fish. A subgrouping of the fish support members may collectively define a trough to support the fish in a belly down or belly up orientation. The fish support members may be spaced in regular intervals along an entire length of the roller chain assembly.

The conveyor system may further include a curvilinear guideway, and the roller chain assembly may include chain links with a range of motion relative to each other to enable the roller chain assembly to bow sideways and adapt to a shape of the curvilinear guideway. The conveyor system may also include a guide rail system positioned above the curvilinear path of the roller chain assembly to assist in guiding the fish from the first fish processing subsystem to the second fish processing subsystem.

The conveyor system may further include a drive motor, a drive sprocket and a controller configured to enable adjustment of a speed of the drive motor and drive sprocket to selectively regulate a rate at which the fish are transported from the first fish processing subsystem to the second fish processing subsystem.

According to one embodiment, a fish conveyor system may be summarized as including a guideway defining a curvilinear path and a roller chain assembly configured to receive fish in a first orientation and deliver the fish in a second orientation that is different than the first orientation, the roller chain assembly including chain links with a range of motion relative to each other to enable the roller chain assembly to bow sideways and adapt to a shape of the guideway. The roller chain assembly may comprise a series of fish support members, each fish support member including a concave profile within which to receive and support a portion of the fish. A subgrouping of the fish support members may collectively define a trough to support the fish in a belly down or belly up orientation. The roller chain assembly may be configured to transport the fish along the curvilinear path, and the curvilinear path may include a central curvilinear portion between two linear end portions that are perpendicular to each other.

According to one embodiment, a method of processing fish may be summarized as including modifying the fish as the fish pass sequentially through a first fish processing subsystem with the fish orientated in a first orientation; transporting the fish from the first fish processing subsystem to a second fish processing subsystem; and modifying the fish as the fish pass sequentially through the second fish processing subsystem with the fish orientated in a second orientation that is different than the first orientation, wherein transporting the fish from the first fish processing subsystem to the second fish processing subsystem includes changing the orientation of the fish from the first orientation to the second orientation. In some instances, the first orientation may be transverse to a direction of travel of the fish through the first fish processing subsystem and the second orientation may be parallel to a direction of travel of the fish through the second fish processing subsystem. Modifying the fish as the fish pass sequentially through the first fish processing subsystem may include deheading the fish, and modifying the fish as the fish pass sequentially through the second fish processing subsystem may include removing viscera of the fish.

Transporting the fish from the first fish processing subsystem to the second fish processing subsystem may include moving the fish along a curvilinear path. The curvilinear path may include a central portion with a generally constant radius of curvature between two linear end portions that are perpendicular to each other. Moving the fish along the curvilinear path may include moving the fish with a roller chain assembly. The roller chain assembly may include a series of fish support members each having a concave profile within which to receive and support a portion of the fish, and moving the fish along the curvilinear path may include supporting each fish in a trough collectively defined by a respective subgrouping of the fish support members. Transporting the fish from the first fish processing subsystem to the second fish processing subsystem may include forcing the roller chain assembly to bow sideways. The method of processing fish may further include guiding the fish from the first fish processing subsystem to the second fish processing subsystem with a guiderail positioned above the roller chain assembly.

BRIEF DESCRIPTION OF THE SEVERAL VIEWS OF THE DRAWINGS

FIG. 5 is an isometric view of a portion of the conveyor system.

FIG. 6 is a side elevational view of the portion of the conveyor system shown in FIG. 5.

FIG. 7 is a top plan view of the portion of the conveyor system shown in FIG. 5.

DETAILED DESCRIPTION

Figure 1:
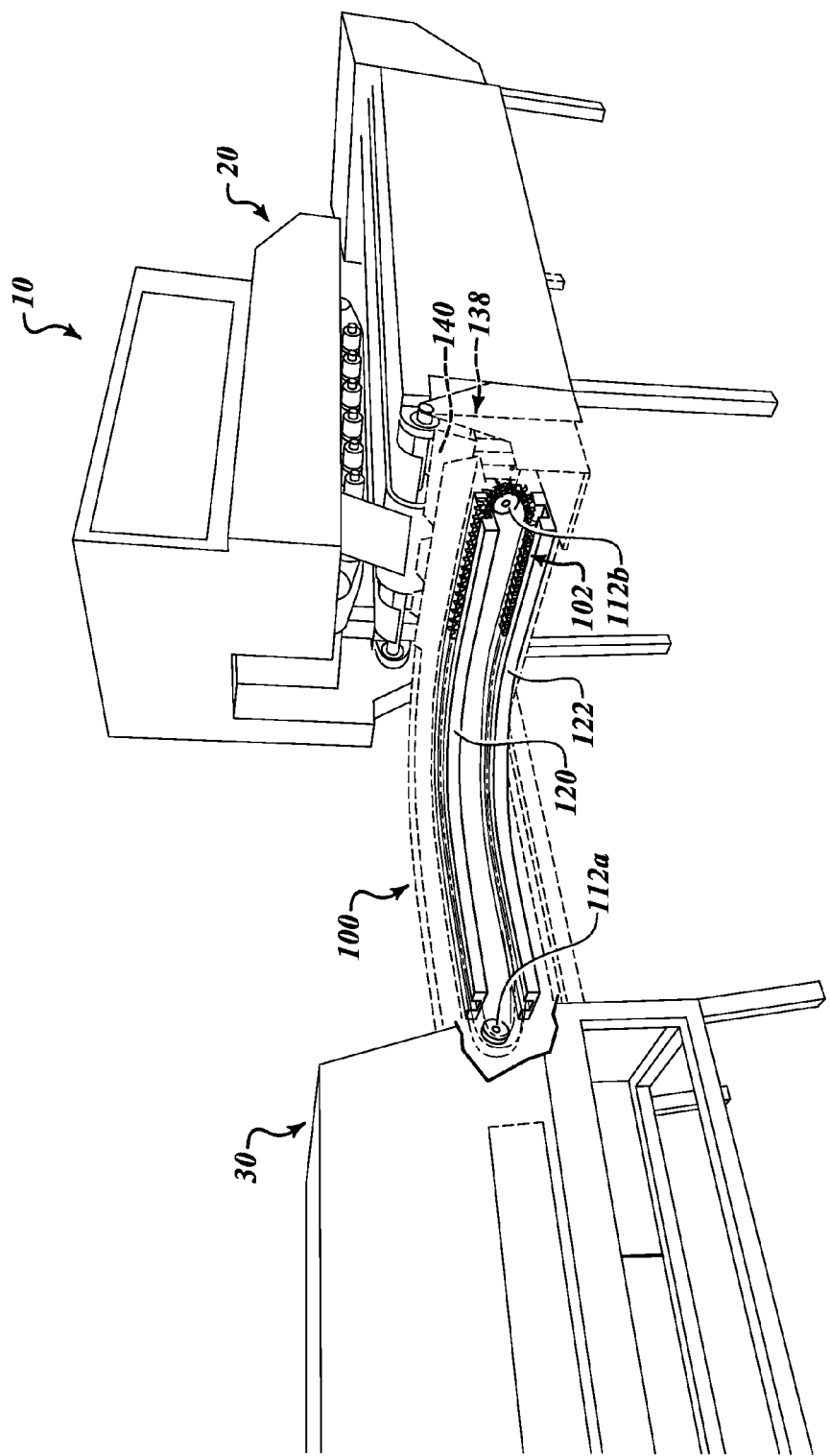
FIG. 1 is a perspective view of a fish processing system, according to one example embodiment, which includes an intermediate conveyor system.

In the following description, certain specific details are set forth in order to provide a thorough understanding of various disclosed embodiments. However, one skilled in the relevant art will recognize that embodiments may be practiced without one or more of these specific details. In other instances, well-known structures and techniques associated with fish processing systems and methods may not be shown or described in detail to avoid unnecessarily obscuring descriptions of the embodiments. For instance, well-known power transmission components may be provided to transmit power to and drive elements of the various fish processing systems described herein. Drive and control systems may also be provided to selectively control a speed with which components move, and thus a rate at which fish are processed.

Unless the context requires otherwise, throughout the specification and claims which follow, the word "comprise" and variations thereof, such as "comprises" and "comprising," are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIGS. 1 through 4 show a fish processing system 10 according to one example embodiment having an intermediate conveyor system 100 for moving fish F between successive processing stations or subsystems 20, 30. More particularly, the example fish processing system 10 includes an upstream fish processing subsystem 20 configured to process fish F in a sequential manner, a downstream fish processing subsystem 30 configured to process fish F in a sequential manner, and an intermediate conveyor system 100 that is coupled between the upstream and downstream fish processing subsystems 20, 30 to move fish F from the upstream fish processing subsystem 20 toward the downstream fish processing subsystem 30.

In some embodiments, the upstream fish processing subsystem 20 may be configured to process fish F in a sequential manner with the fish F orientated in a first orientation, and the downstream fish processing subsystem 30 may be configured to process fish F in a sequential manner with the fish F orientated in a second orientation that is different from the first orientation. For example, with reference to FIG. 2, the upstream fish processing subsystem 20 may be configured to process fish F in a sequential manner with the fish F orientated transverse to a direction of travel $T_1$ through the first fish processing subsystem, and the downstream fish processing subsystem 30 may be configured to process fish F in a sequential manner with the fish F orientated generally parallel to a direction of travel $T_2$ through the downstream fish processing subsystem 30. In such instances, the conveyor system 100 is advantageously configured to receive fish F in a first orientation transverse to the direction of travel $T_1$ through the upstream fish processing subsystem 20 and to deliver fish F in a second orientation generally parallel to the direction of travel $T_2$ through the second fish processing subsystem 30.

According to some embodiments, the upstream fish processing subsystem 20 may be a fish deheading station that is configured to sever and remove the head of the fish F. Examples of fish deheading systems that may serve as an appropriate upstream fish processing subsystem 20 include the systems shown and described in U.S. Patent Application Publication No. 2013/0189913, which is incorporated herein by reference in its entirety.

For example, the upstream fish processing subsystem 20 may be a deheading station that includes a structural frame to support various conveying and processing elements. The frame may support at least a portion of a conveyor system which is configured to convey fish F received on a conveyor device thereof across a cutting location during operation. The conveyor device of the conveyor system may include, for example, belts, chains or movable beds for transporting the fish F across the cutting location. In some instances, for example, the conveyor device may include roller chains routed over a plurality of corresponding sprockets which are arranged to carry fish F in a feed direction, as represented by the arrow labeled $T_1$, with the fish orientated transversely. Locating features, such as, for example, upstanding pegs or other protrusions, may be coupled to the roller chains for positioning the fish F at regular intervals and in consistent positions for subsequent processing operations. Collectively, the roller chains and locating features may locate the fish F at generally regular and consistent intervals to be cut in a repeatable manner as the roller chains transport the fish F toward the cutting location.

A conveyor drive motor, such as, for example, an electric rotary drive motor, may be provided to drive the conveyor device (e.g., roller chains and sprockets) of the conveyor system. The conveyor drive motor may be attached to the structural frame and may include a drive shaft which is drivingly coupled to the conveyor device to cause the conveyor device to move via rotary motion thereof. The drive shaft may be coupled to the conveyor device by various conventional power transmission components, such as, for example, a tractive element in the form of a belt or chain and a plurality of sheaves, pulleys and/or sprockets. According to some embodiments, a drive sprocket may be coupled to the drive shaft of the conveyor drive motor and linked to a conveyor sprocket via a tractive element in the form of a roller chain. The conveyor sprocket may be fixedly attached to a drive shaft or rod and ultimately coupled to a primary roller chain of the conveyor system via one or more additional sprockets.

The deheading subsystem or station may further include an intermittent drive mechanism coupled between the drive shaft of the conveyor drive motor and a blade actuation device to intermittingly move a blade between a standby position and a cutting position to sequentially sever a head or other portion from each of the fish F conveyed across the cutting location. The intermittent drive mechanism may be, for example, a Geneva drive or other gear mechanism coupled to the conveyor drive motor. Consequently, movement of the blade actuation device may be physically coordinated with movement of the fish F through the cutting location. After the head or other portion is severed, the headless or otherwise processed fish F portion may continue forward for further processing as described herein and the severed fish head or other fish portion may be discarded or collected for other purposes.

The downstream fish processing subsystem 30 may be a fish gutting station that is configured to remove viscera of the fish F as the fish F are transported through the fish gutting station. Examples of fish gutting systems that may serve as an appropriate downstream fish processing subsystem 30 include the systems shown and described in U.S. Pat. No. 8,512,106, which is incorporated herein by reference in its entirety.

For example, the downstream fish processing subsystem 30 may be a gutting station that includes a fish infeed trough for supporting fish F in a generally upright position as the fish F are fed via an infeed conveyor belt toward a cutting device, a gutting device and other components of the system. A guide roller may be provided to engage a back of the fish F as the fish progress toward the cutting device and other components of the subsystem 30. The guide roller may assist in positioning the fish F for further transport by vertically aligned conveyor belts on opposing sides of the fish F. The conveyor belts may be driven by drive pulleys and urged toward a centerline of the system by tension roller assemblies disposed along a transport path of the fish F to accommodate fish F of varying size, shape and firmness.

Fish F may be conveyed from the infeed trough towards the cutting device. The cutting device may include a floor plate positioned to support the fish F as the fish F are sequentially fed over a guide for further processing. The floor plate may be flexibly coupled to the cutting device by a spring element or other resilient device to enable the floor plate to flex in response to the fish F as the guide passes through the fish F. The floor plate and guide may operate together to isolate the meat of the fish belly for cutting and to effectively shield the viscera from damage during the cutting operation.

The gutting station or subsystem may be further configured to feed the fish F which have been cut along their belly by the cutting device to the gutting device for further processing. More particularly, the fish F may be fed to the gutting device for removal of the viscera of the fish F, including the gonads. For this purpose, the gutting device may include an extractor that is positioned or positionable to enter the fish F below the backbone and above the gullet of the fish F. In some instances, a guide may be positioned upstream of the gutting device to assist in properly aligning the fish F with the extractor. During operation, the fish F may pass over the guide after leaving the cutting device and may be guided to a predetermined position with respect to the extractor, or more particularly, a tip of the extractor. As the tip of the extractor enters and passes through the fish F, the extractor severs the connection between the gullet and the remainder of the fish F.

In some instances, the extractor may be attached to a frame which is movably coupled to a base of the fish processing subsystem 30 to position the tip of the extractor at different elevations or heights during the gutting operation. For example, the frame may be pivotably coupled to the base to rotate about an axis of rotation. During operation, the tip of the extractor may be positioned at a first height when entering the fish F and the tip moved to another height prior to exiting the fish F by rotating the frame and hence extractor about the axis of rotation. In other embodiments, the frame may be coupled to the base by a linkage mechanism, such as, for example a four-bar linkage mechanism to enable height adjustment of the extractor during the gutting operation. In still further embodiments, the frame may be coupled to the base to translate linearly, such as, for example, along elongated slots. Still further, in other instances, the extractor may remain stationary while an upstream guide is moved relative to the extractor.

In some embodiments, the extractor may move between different heights in a step-wise manner, and in other embodiments, may move in a continuous manner. For example, an actuator, such as, for example, a two-position air cylinder, may be coupled between the frame and the base to transition the tip of the extractor at a first height when entering the fish F and a second height when exiting the fish F. Movement of tension rollers engaging conveyor belts which may be transporting the fish F, a lever or other mechanism that senses or contacts a portion of the fish F during transport, actuators (e.g., air cylinders) coupled to devices that sense or contact the collar or another part of the fish F during transport or other sensing and control devices may be positioned along the transport path of the fish F to determine a position of the fish F during the gutting operation and trigger the actuator to move the tip of the extractor accordingly.

In some instances, the gutting device of the gutting subsystem or station may further include a pair of wing members to assist in gathering viscera of the fish F during the gutting operation and to assist in severing the viscera from the body of the fish F. The wing members may be rotatably coupled to the frame of the gutting device by a hinge or other structure such that the wing members may transition between an open configuration in which the wing members are spread relatively further apart, and a closed configuration in which the wing members are relatively closer together.

The wing members may be configured to transition from the closed configuration to the open configuration shortly after entering the fish F. Movement of tension rollers engaging conveyor belts which may be transporting the fish F, a lever or other mechanism that senses or contacts a portion of the fish F during transport, position sensors that sense or contact the collar or another part of the fish F during transport or other sensing and control devices may be positioned along the transport path of the fish F to determine a position of the fish F during the gutting operation and trigger the wing members to move. For instance, a position sensor may be positioned to sense a position of the fish F during the gutting operation and trigger the wing members to transition from the closed configuration to the open configuration. An actuator may be coupled between the frame and the wing members for this purpose. The wing members may advantageously gather the viscera in a particularly nondestructive manner during the gutting operation. After gathering the viscera, the wing members may transition back to the closed configuration to assist in separating the viscera from the fish F by severing the viscera in the intersection between the wing members and the extractor. Again, movement of the wing members may be triggered by a variety of sensor and control devices. In addition, the movement of the wing members may be coordinated with movement of the extractor, such as, for example, to occur simultaneously or sequentially.

After the viscera is removed by the gutting device of the downstream fish processing subsystem 30, the remaining fish product may be transported downstream for further processing and/or cleaning. For example, one or more kidney scrapers may be positioned downstream of the gutting device to scrape or otherwise pierce the kidneys of the fish F. The kidney scrapers may be biased toward the underside of the fish F to apply a predetermined amount of force to the fish F when scraping or piercing the kidneys. As another example, rotatable brushes may be located downstream of the gutting device to further clean the interior of the fish F as the fish F pass over the rotatable brushes. In some embodiments, fluid jets and/or suction devices may also be provided in combination with or in lieu of the brushes to further clean the remaining fish product during the cleaning operation. For example, the downstream fish processing subsystem 30 may include one or more suction head assemblies that are positioned between adjacent brushes. After the fish product is adequately gutted and cleaned, the fish product may be discharged from the downstream fish processing subsystem 30 for packaging, or in some cases, further processing. The viscera, including the gonads, can also be discharged or collected for packaging or further processing.

As previously described, the fish processing system 10 shown in FIGS. 1 through 4 includes an intermediate conveyor system 100 that is coupled between the upstream and downstream fish processing subsystems 20, 30 to move fish F from the upstream fish processing subsystem 20 to the downstream fish processing subsystem 30. In some instances, the intermediate conveyor system 100 may include a roller chain assembly 102 that is configured to transport the fish F from the upstream fish processing subsystem 20 to the downstream fish processing subsystem 30 along a curvilinear transport path P. As shown best in FIG. 2, the curvilinear transport path P may include a central portion $P_1$ having a generally constant radius of curvature R between two linear end portions $P_2$, $P_3$ that are perpendicular to each other. In other instances, the transport path P may have a varying radius of curvature and/or sections with different curvatures, such as, for example, an S-curved path. According to some embodiments, at least a portion of the transport path P is non-linear.

Further details of the example roller chain assembly 102 are shown in the enlarged detail views of FIGS. 5 through 7. The roller chain assembly 102 includes a roller chain 104 which may comprise inner links 106a, outer links 106b, bushings, bearings 107a, 107b and pins 108a, 108b. The roller chain assembly 102 is advantageously constructed so as to enable at least some lateral bending or flexing of the roller chain 104. The roller chain 104 may be, for example, a sidebow roller chain having tapered bushings, which are available from Peer Chain Company of Waukegan, Ill. under part nos. 40SB, 50SB, 60SB and 80SB.

The roller chain assembly 102 may further include a series of fish support members 114a-c (collectively 114) that are coupled to the roller chain 104. The fish support members 114a-c may be welded, adhered, fastened, or otherwise affixed to links of the roller chain 104 to move therewith. Each fish support member 114a-c may include a concave profile 116a-c (collectively 116) within which to receive and support a portion of the transported fish F. The concave profile 116 of each fish support member 114a-c may be generally U-shaped and may define a notch in a base structure, such as, for example, a base plate. A subgrouping of the fish support members 114 may collectively define a trough to support a given fish F in a belly down or belly up orientation. For example, a trough may be collectively defined by the concave profile 116 of each of a subgrouping of the fish support members 114. The trough may have a semi-cylindrical or partial-cylindrical shape. The fish support members 114a-c may be spaced in regular intervals along an entire length of the roller chain 104. For example, a respective fish support member 114 may be coupled to every other link 106a, 106b of the roller chain 104. In this manner, the roller chain assembly 102 may provide a continuous recirculating trough structure that is particularly well adapted to receive and transport the fish F.

Figure 2:
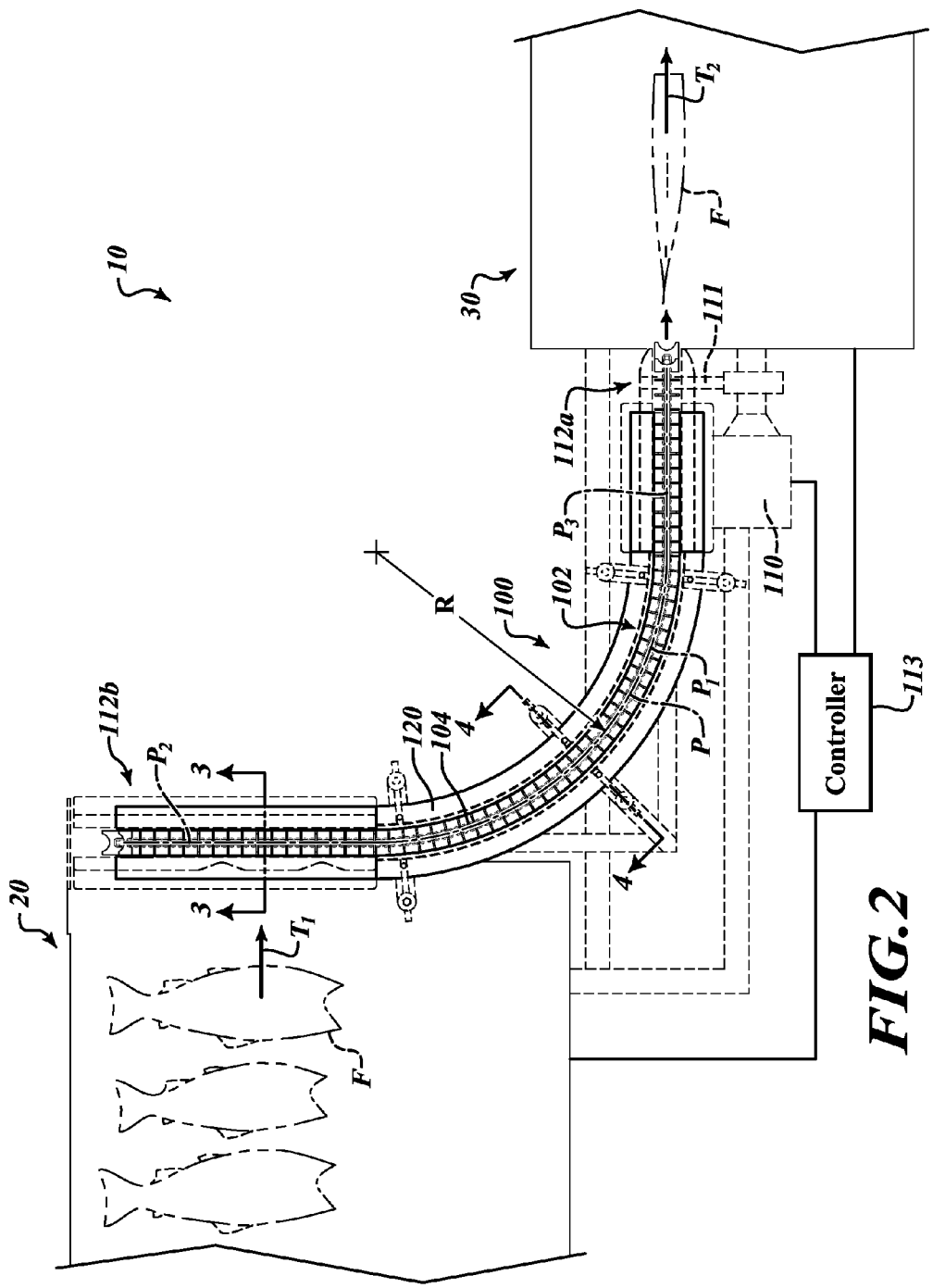
FIG. 2 is a partial top plan view of the fish processing system of FIG. 1.
Figure 4:
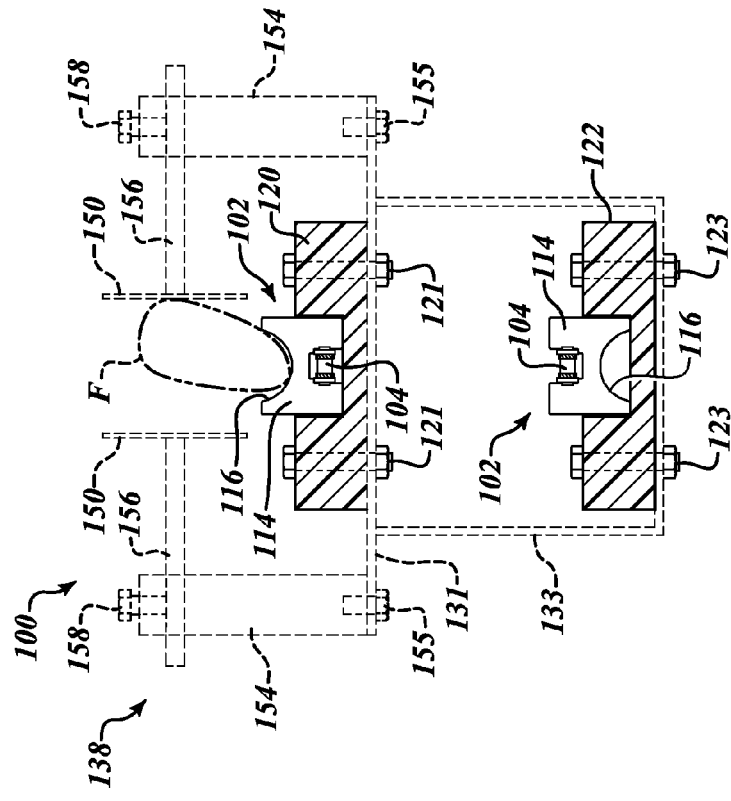
FIG. 4 is a cross-sectional view of the conveyor system of the fish processing system taken along line 4-4 of FIG. 2.
Figure 3:
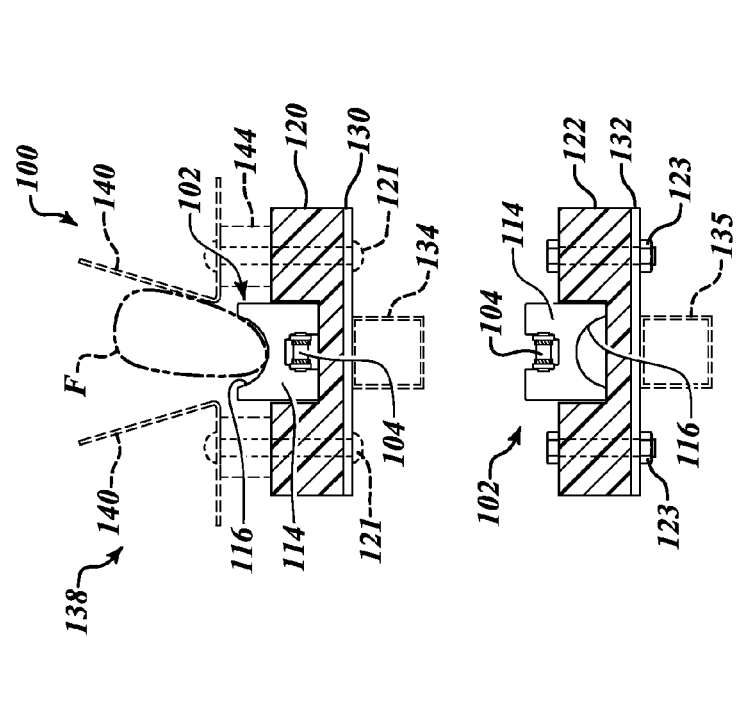
FIG. 3 is a cross-sectional view of the conveyor system of the fish processing system taken along line 3-3 of FIG. 2.

With reference to FIGS. 2 through 4, the intermediate conveyor system 100 may further include one or more curvilinear guideways 120, 122 to assist in guiding the roller chain assembly 102 along the transport path P. Again, the roller chain assembly 102 may include a roller chain 104 with chain links 106a, 106b that have a range of motion relative to each other to enable the roller chain assembly 102 to bow sideways. This can enable the roller chain assembly 102 to adapt to a shape of the one or more curvilinear guideways 120, 122.

In some instances, the intermediate conveyor system 100 may include an upper guideway 120 to guide the roller chain assembly 102 as it moves in a direction from the upstream fish processing subsystem 20 toward the downstream fish processing subsystem 30 and a lower guideway 122 to guide the roller chain assembly 102 as it moves in a direction from the downstream fish processing subsystem 30 back toward the upstream fish processing subsystem 20. Each of the guideways 120, 122 may be a continuous structure that extends between a location at or near the upstream fish processing subsystem 20 and a location at or near the downstream fish processing subsystem 30, and each of the guideways 120, 122 may include a groove, track or other feature or features to define the transport path P, as shown best in FIG. 2. In other instances, each of the guideways 120, 122 may be segmented or discontinuous with a plurality of guideway units or portions collectively defining the transport path P. In some embodiments, the guideways 120, 122 may be machined or otherwise formed from a durable material having a low coefficient of friction, such as, for example, UHMW or other plastic materials with similar properties.

With reference to FIGS. 3 and 4, the guideways 120, 122 may be supported by a base frame structure comprising various structural support components 130-135. For example, in one or more locations, the upper and lower guideways 120, 122 may be supported on respective base members 130, 132 and each base member 130, 132 may be supported or reinforced with a structural support member 134, 135, such as, for example, rectangular bar stock, as shown in FIG. 3. As another example, in one or more locations, the upper and lower guideways 120, 122 may be supported on respective base members 131, 133 with the base members 131, 133 coupled together or formed together to define a rigid frame structure that collectively supports both guideways 120, 122, as shown in FIG. 4. The guideways 120, 122 may be coupled to the various structural support components 130-135 via fasteners 121, 123 or other joining devices or techniques.

With continued reference to FIGS. 3 and 4, the intermediate conveyor system 100 may further include a guide rail system 138 positioned above the curvilinear transport path P of the roller chain assembly 102 to assist in guiding the fish F from the upstream fish processing subsystem 20 toward the downstream fish processing subsystem 30. The guide rail system 138 may include one or more rail members 140, 150 positioned on opposing lateral sides of the fish transport path P to assist in receiving fish F from the upstream fish processing subsystem 20 and guiding the fish F toward the downstream fish processing subsystem 30.

As an example, an upstream portion of the intermediate conveyor system 100 may include a pair of opposing upwardly diverging rail members 140 which are provided to assist in receiving fish F from the upstream fish processing subsystem 20, as shown best in FIG. 3. The upwardly diverging rail members 140 may funnel inbound fish F toward the roller chain assembly 102 such that the fish F are subsequently picked up and carried forward by the roller chain assembly 102 during operation. The upwardly diverging rail members 140 may be coupled to the upper guideway 120 via fasteners 121 and spacers 144, or any other appropriate joining device or technique.

As another example, an intermediate and/or terminal portion of the intermediate conveyor system 100 may include a pair of opposing rail members 150 that are generally parallel to each other or otherwise shaped to assist in guiding fish F toward the downstream fish processing subsystem 30, as shown best in FIG. 4. The rail members 150 may generally confine lateral movement of the fish F and guide the fish F toward the downstream fish processing subsystem 30 such that the fish F may be delivered to conveyance devices of the downstream fish processing subsystem 30, such as, for example, opposing lateral transport belts of the downstream fish processing subsystem 30. The rail members 150 may be coupled to the base member 131 supporting the upper guideway 120 via fasteners 155 and spacers 154, or any other appropriate joining device or technique. In addition, the rail members 150 may be laterally adjustable to accommodate fish F of varying width. For example, the rail members 150 may be supported by rods 156 or other structures that are adjustably coupled to upstanding spacers 154 or other structures. The lateral position of the rail members 150 may be adjusted and then fixed by appropriate locking devices, such as, for example, threaded fasteners 158 for selectively engaging the support rods 156 or other support structures.

With reference to FIGS. 1 and 2, the intermediate conveyor system 100 of the fish processing system 10 may further include a drive motor 110, a drive sprocket 112$a$, driven sprocket 112$b$, and a controller 113 configured to enable adjustment of a speed of the drive motor 110 and drive sprocket 112$a$ and to selectively regulate a rate at which the fish F are transported from the upstream fish processing subsystem 20 to the downstream fish processing subsystem 30. The drive motor 110 may be, for example, an electric rotary drive motor, and may be coupled to the drive sprocket 112$a$ directly or via conventional power transmission components 111, such as, for example, gears, belts, drive shafts and the like. The controller 113 may also be communicatively coupled to the upstream and downstream fish processing subsystems 20, 30 to control functionality thereof and/or coordinate functionality thereof with the intermediate conveyor system 100. For example, the controller 113 may control a feed rate of the upstream fish processing subsystem 20 to the intermediate conveyor system 100, a transport rate of the conveyor system 100, and/or a processing rate of the downstream fish processing subsystem 30. The feed rate, transport rate and processing rate may be controlled simultaneously or independently, and the feed rate, transport rate and processing rate may differ from each other to adjust spacing between successive fish F as they move through different stages of processing. As another example, when the upstream fish processing subsystem 20 is a deheading system and the downstream fish processing subsystem 30 is a gutting system, the controller 113 may also be configured to control movement of the blade for severing the heads of the fish F and to control movement of gutting devices for removing the guts of the fish F.

In accordance with the embodiments of the fish processing systems 10 described herein, related methods of processing fish F are provided. For instance, in some embodiments, a method of processing fish F may be provided which includes modifying fish F as the fish F pass sequentially through an upstream fish processing subsystem 20 with the fish F orientated in a first orientation; transporting the fish F from the upstream fish processing subsystem 20 to a downstream fish processing subsystem; and modifying the fish F as the fish F pass sequentially through the downstream fish processing subsystem 30 with the fish F orientated in a second orientation that is different than the first orientation, wherein transporting the fish F from the upstream fish processing subsystem 20 to the downstream fish processing subsystem 30 includes changing the orientation of the fish F from the first orientation to the second orientation.

According to some embodiments, the first orientation may be transverse to a direction of travel $T_1$ of the fish F moving through the upstream fish processing subsystem 20 and the second orientation may be parallel to a direction of travel $T_2$ of the fish F moving through the downstream fish processing subsystem. In this manner, transporting the fish F from the upstream fish processing subsystem 20 to the downstream fish processing subsystem 30 may include rotating the orientation of the fish F about ninety degrees. In other instances, the fish F may be rotated more or less. In addition, the fish F may change elevation as they move toward the downstream fish processing subsystem.

Modifying the fish F as the fish F pass sequentially through the upstream fish processing subsystem may include deheading the fish F, and modifying the fish F as the fish F pass sequentially through the downstream fish processing subsystem 30 may include removing viscera of the fish F. In this manner, the fish F may move through an upstream deheading subsystem with the fish F generally transverse to the direction of travel $T_1$, and then the fish F may be rotated about ninety degrees by the intermediate conveyor system 100 to align with the direction of travel $T_2$ through a downstream degutting subsystem for subsequent removal of viscera from the headless fish product.

Transporting the fish F from the upstream fish processing subsystem 20 to the downstream fish processing subsystem 30 may include moving the fish F along a curvilinear transport path P. As discussed earlier, the curvilinear transport path P may include a central portion $P_1$ with a generally constant radius of curvature R between two linear end portions $P_2$, $P_3$ that are perpendicular to each other. In other instances, the transport path P may have a varying radius of curvature and/or sections with different curvatures, such as, for example, an S-curved path. Moving the fish F along the curvilinear transport path P may include moving the fish F with the roller chain assembly 102 described earlier. For instance, moving the fish F along the curvilinear transport path P may include supporting each fish F in a trough collectively defined by a respective subgrouping of fish support members 114 that are coupled to the roller chain 104. The roller chain assembly 102 may recirculate continuously to move the fish F from the upstream fish processing subsystem 20 toward the downstream fish processing subsystem 30.

Although the fish processing systems 10 and related methods described herein are directed in particular to conveying fish F between various fish processing subsystems or stations 20, 30, it is appreciated that aspects of the systems 10 and methods may be applied to the transportation of fish F or other items more generally. For instance, it is appreciated that aspects of the systems 10 and methods may be applicable to processing products other than fish F, such as, for example, other asymmetric food or non-food products which may require cutting, severing or other processing in different orientations in various subsystems or stations.

Furthermore, features and aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fish processing system, comprising:
a first fish processing subsystem configured to process fish in a sequential manner with the fish orientated in a first orientation that is transverse to a direction of travel through the first fish processing subsystem;
a second fish processing subsystem positioned downstream of the first fish processing subsystem, the second fish processing subsystem configured to process the fish in a sequential manner with the fish orientated in a second orientation that is parallel to a direction of travel through the second fish processing subsystem; and
a conveyor system that couples the first fish processing subsystem to the second fish processing subsystem, the conveyor system configured to receive the fish in the first orientation transverse to the direction of travel through the first fish processing subsystem and deliver the fish in the second orientation parallel to the direction of travel through the second fish processing subsystem, and the conveyor system including a roller chain assembly configured to transport the fish from the first fish processing subsystem to the second fish processing subsystem along a curvilinear path.

2. The fish processing system of claim 1 wherein the first fish processing subsystem is a fish deheading station configured to dehead the fish as the fish are transported through the fish deheading station.

3. The fish processing system of claim 1 wherein the second fish processing subsystem is a fish gutting station configured to remove viscera of the fish as the fish are transported through the fish gutting station.

4. The fish processing system of claim 1 wherein the curvilinear path includes a central portion having a generally constant radius of curvature between two linear end portions that are perpendicular to each other.

5. The fish processing system of claim 1 wherein the roller chain assembly comprises a series of fish support members, each fish support member including a concave profile within which to receive and support a portion of the fish.

6. The fish processing system of claim 5 wherein a subgrouping of the fish support members collectively define a trough to support the fish in a belly down or belly up orientation.

7. The fish processing system of claim 5 wherein the fish support members are spaced in regular intervals along an entire length of the roller chain assembly.

8. The fish processing system of claim 1 wherein the conveyor system further includes a curvilinear guideway, and wherein the roller chain assembly includes chain links with a range of motion relative to each other to enable the roller chain assembly to bow sideways and adapt to a shape of the curvilinear guideway.

9. The fish processing system of claim 1 wherein the conveyor system further includes a guide rail system positioned above the curvilinear path of the roller chain assembly to assist in guiding the fish from the first fish processing subsystem to the second fish processing subsystem.

10. The fish processing system of claim 1 wherein the conveyor system further comprises a drive motor, a drive sprocket and a controller configured to enable adjustment of a speed of the drive motor and drive sprocket to selectively regulate a rate at which the fish are transported from the first fish processing subsystem to the second fish processing subsystem.

11. A fish processing system, comprising:
a fish deheading station configured to dehead fish in a sequential manner with the fish orientated in a first orientation that is transverse to a direction of travel through the fish deheading station;
a fish gutting station positioned downstream of the fish deheading station, the fish gutting station configured to remove viscera of the fish in a sequential manner with the fish orientated in a second orientation that is parallel to a direction of travel through the fish gutting station; and
a conveyor system that couples the fish deheading station to the fish gutting station, the conveyor system including a roller chain assembly configured to receive the fish in the first orientation transverse to the direction of travel through the fish deheading station and deliver the fish in the second orientation parallel to the direction of travel through the fish gutting station, and the conveyor system including a roller chain assembly configured to transport the fish from the fish deheading station to the fish gutting station along a curvilinear path.

\* \* \* \* \*